United States Patent
Japha et al.

(10) Patent No.: US 8,717,678 B2
(45) Date of Patent: May 6, 2014

(54) GUIDED MATTER-WAVE SAGNAC INTERFEROMETER

(71) Applicant: Ben Gurion University of the Negev, Research and Development Authority, Beer Sheva (IL)

(72) Inventors: Yonathan Japha, Rehovot (IL); Ron Folman, Rehovot (IL); Yshai Avishai, Omer (IL)

(73) Assignee: Ben Gurion University of the Negev, Research and Development Authority, Beer Sheva (IL)

( * ) Notice: Subject to any disclaimer, the term of this patent is extended or adjusted under 35 U.S.C. 154(b) by 0 days.

(21) Appl. No.: 13/734,984

(22) Filed: Jan. 6, 2013

(65) Prior Publication Data
US 2013/0188193 A1    Jul. 25, 2013

Related U.S. Application Data

(63) Continuation of application No. 12/521,582, filed as application No. PCT/IL2007/001611 on Dec. 26, 2007, now Pat. No. 8,351,121.

(60) Provisional application No. 60/877,591, filed on Dec. 29, 2006.

(51) Int. Cl.
*G02B 27/14* (2006.01)

(52) U.S. Cl.
USPC .......................................................... 359/629

(58) Field of Classification Search
CPC ...................................... G02B 27/144–27/148
USPC .................................................. 359/629, 583
See application file for complete search history.

(56) References Cited

U.S. PATENT DOCUMENTS

| | | | |
|---|---|---|---|
| 3,657,927 A | 4/1972 | Tyson | |
| 3,761,721 A | 9/1973 | Altshuler et al. | |
| 4,705,399 A | 11/1987 | Graindorge et al. | |
| 4,992,656 A | 2/1991 | Clauser | |
| 6,476,383 B1 | 11/2002 | Esslinger et al. | |
| 2004/0081462 A1* | 4/2004 | Sarah | 398/42 |

OTHER PUBLICATIONS

International Search Report Application No. PCT/ IL 07/ 01611 Date of Mailing Sep. 17, 2008.

* cited by examiner

*Primary Examiner* — Scott J Sugarman
*Assistant Examiner* — Vipin Patel
(74) *Attorney, Agent, or Firm* — Pearl Cohen Zedek Latzer Baratz LLP; Mark S. Cohen

(57) ABSTRACT

The present invention provides an interferometer apparatus comprising a matter-wave guide enclosing an area, wherein a flux of particles may be guided in the matter-wave guide in at least two opposite paths, the matter-wave guide is rotatable relative to an inertial frame of reference; a first beam splitter to split the first beam to at least second and third beams, each of the second and third beams is to be guided in another path of the two opposite paths; and a second beam splitter allowing particles of the second and third beams to exit the matter-wave guide in a first probability and to stay in the matter-wave guide in a second probability.

3 Claims, 2 Drawing Sheets

GUIDED MATTER-WAVE SAGNAC INTERFEROMETER

CROSS REFERENCE TO RELATED APPLICATIONS

This application is a Continuation of U.S. patent application Ser. No. 12/521,582, now U.S. Pat. No. 8,351,121, which is the National Phase Application of International Application No. PCT/IL2007/001611, filed on Dec. 26, 2007, which claims the benefit of U.S. Provisional Patent Application Ser. No. 60/877,591, filed Dec. 29, 2006, all of which are incorporated herein by reference in their entirety.

BACKGROUND OF THE INVENTION

Sagnac effect is a phase shift induced in a wave propagating in a loop by rotation of the loop. Two waves propagating in opposite directions along a rotating closed loop may interfere in a point of exit, wherein the rotation may cause a phase shift between them. An optical Sagnac Interferometer apparatus may include, for example, a loop trajectory enclosing an area. The interferometer may operate by splitting a beam of light at an entrance of the loop, to two beams which may be made to propagate in opposite directions along the loop trajectory. An interference pattern may be obtained at a point of exit from the loop. When the apparatus rotates, the path length of one of the beams may be effectively shortened, while the path length of the other beam may be effectively lengthened. Therefore, a phase shift may be created between the two beams, dependent on the rotation velocity of the apparatus.

Therefore, a Sagnac interferometer may measure changes in the rotation frequency of the frame that it is fixed to, relative to a global (inertial) frame of reference. The Sagnac effect in a wave propagating through a closed rotating ring induces a phase shift proportional to the rotation frequency $\Omega$ of this rotation and the area A of the ring. For light waves with frequency $\omega$ this phase shift may be represented by $\Phi_{light} = (2\omega A/c^2)\Omega$, where c is the speed of light and $\omega$ is the light frequency. For matter waves of massive particles with mass m, the induced phase shift may be represented by $\Phi_{matter} = (2mA/\hbar)\Omega$, which is larger than the phase shift in an optical SI having the same area A by $mc^2/\hbar\omega$, wherein $\hbar$ is plank's constant. Therefore, the Sagnac phase is much more sensitive to rotations in a matter-wave SI compared to light wave SI, for example, by 10 orders of magnitude. However, state-of-the-art matter-wave Sagnac interferometers, which are based on beams of atoms traveling in free space, are limited by their area, number of atoms and the allowed momentum bandwidth of the atoms.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
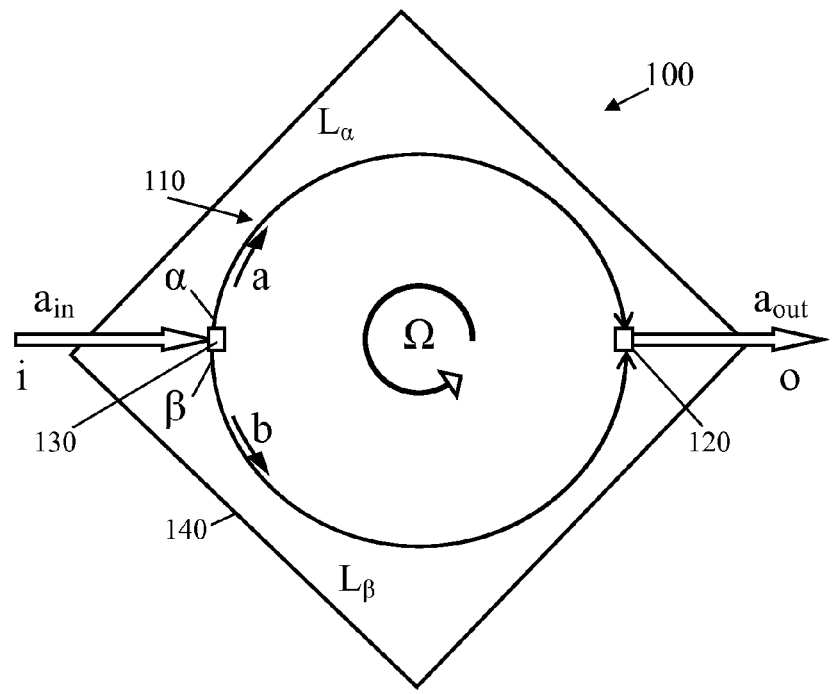
FIG. 1 is a schematic illustration of a SI (Sagnac interferometer) according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The present invention may provide a Sagnac interferometer employing guided matter wave. The interferometer according to embodiments of the present invention may operate with high flux of particles with wide bandwidth, thus providing a clear and evident signal over transient noise. The interferometer according to embodiments of the present invention may provide better rotation sensitivity than prior interferometers by using matter-waves instead of light waves. The interferometer according to embodiments of the present invention may further provide better rotation sensitivity relative to for example, previous matter-wave SIs (Sagnac interferometers) by providing larger effective area of the SI loop, for example, without enlargement of the real area occupied by the loop.

Reference is now made to FIG. 1, which is a schematic illustration of a SI (Sagnac interferometer) 100 according to some embodiments of the present invention. SI 100 may include a loop guide 110, along which matter-waves of particles may propagate in clockwise or counterclockwise direction, for example, in trajectories a or b respectively. SI 100 may include input port i, through which, for example, matter-waves may enter the loop. Input i may be connected to loop 110 by splitter 130, which may split the matter-wave, for example, upon entrance, to two matter-waves propagating in opposite directions, for example, through loop ports $\alpha$ and $\beta$. SI 100 may include output port o, through which the particles may exit loop 110. Output port o may be connected to loop 110 by splitter 120, through which the particles may exit to output port o in a certain probability (1-R) or may stay in the loop trajectory in a complimentary probability R. As the probability R is larger, the particles may do more passes through loop 110 before leaving loop 110 through output port o. The paths of the particles through port $\alpha$ or $\beta$ to splitter 120 may have lengths $L_\alpha$ or $L_{62}$, respectively. If $L_\alpha \neq L_{82}$, there may be a phase difference between the matter-waves in trajectories a and b, which may be proportional to the velocity of the particles in the matter wave. Loop 110 may rotate at a rotation frequency $\Omega$ relative to inertial frame 140. If loop 110 rotates, for example, clockwise, particles propagating clockwise in the loop through trajectory a may reach the splitter 120 with an additional negative phase shift, while particles propagating anti clockwise through trajectory b may reach splitter 120 with a positive phase shift. The phase difference between the two trajectories may determine the output amplitude $a_{out}$. Thus, the phase shift between the matter-waves in trajectories a and b may change with the rotation frequency $\Omega$.

The rotation velocity Ω may be deduced, therefore, from the output amplitude $a_{out}$. In a general embodiment of an SI, if other origins for velocity (or momentum) dependent phase shifts between the two trajectories exist, such as, for example, when $L_\alpha \neq L_\beta$, the interference pattern at the output port o may be smeared out and the rotation sensitivity may disappear if the initial beam of particles is a mixture of many velocities.

SI 100 may receive input flux of particles through input port i, for example, with momentum bandwidth Δk. If $L_\alpha \neq L_\beta$ and Δk is relatively wide, e.g., $\Delta k \delta L \gg 1 (\delta L = L_\alpha - L_\beta)$, the interfering counter-propagating fluxes of wide range of longitudinal momentums from ports α and β may cancel each other at port o, so that, for example, the dependency of the output at port o on the rotational phase shift $\Phi_{matter}$ and/or the rotation frequency Ω may be substantially weakened. In this case, the rotational sensitivity of SI 100 may be damaged. Only counter-propagating waves which follow trajectories with substantially the same length may contribute visible dependency in the rotational phase shift in the output. In some embodiments of the present invention, in the case of $L_\alpha \neq L_\beta$, internal reflections may enable existence of opposite paths with same length.

In case most of the particles follow trajectories with substantially the same length, e.g., the path lengths $L_\alpha$ and $L_\beta$ are equal, Δk may be relatively wide without damaging the rotational sensitivity of SI 100. Thus, for example, high flux of particles with wide bandwidth is enabled, thus providing a clear signal which may be evident over transient noise. This may facilitate very sensitive detection of small changes in rotation frequency Ω.

The area A is the effective area enclosed by the trajectory of the particles. As mentioned above, particles may exit loop 110 through splitter 120 in a certain probability (1-R) or may stay in the loop trajectory in a complimentary probability R. As the probability R is larger, the particles may do more passes through loop 110 before leaving loop 110 through output port o. As the particles do more passes, the effective area A is larger, thus, for example, the rotational sensitivity of SI 100 may be greater.

Figure 2:
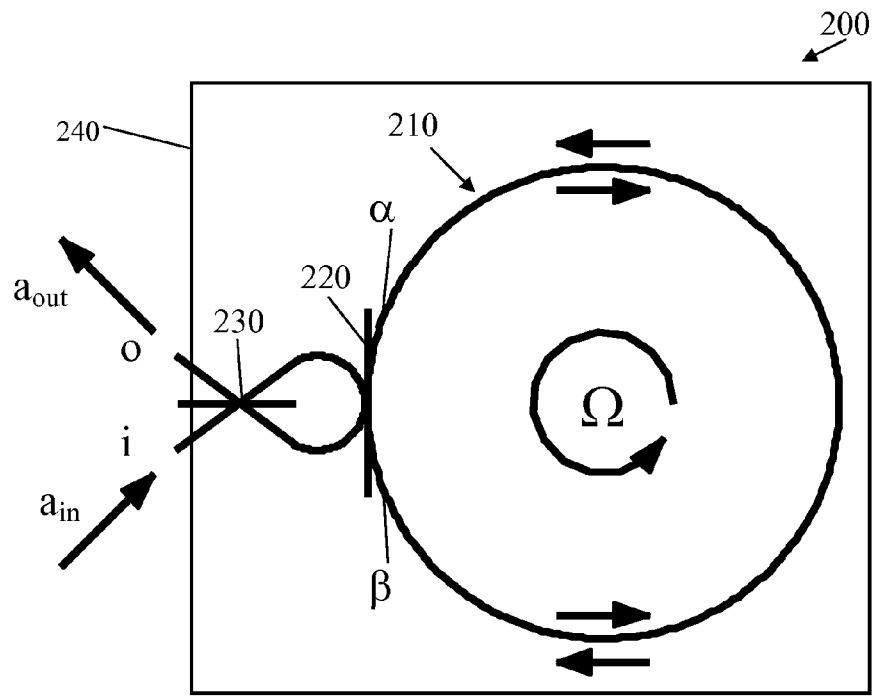
FIG. 2 is an exemplary illustration of a SI (Sagnac interferometer) according to some embodiments of the present invention.

Reference is now made to FIG. 2, which is an exemplary illustration of a SI (Sagnac interferometer) 200 according to some embodiments of the present invention. SI 200 may include a guiding loop 210, BS (beam splitter) 220, BS 230, input port i and output port o. BS 230 may have substantially equal transmission and reflection probabilities, e.g., which may be substantially equal to 0.5. BS 230 may split particle beam incident from input port i into two beams, e.g., reflected beam and transmitted beam, with substantially equal probabilities and, for example, a phase difference of approximately π/2 between them. BS 220 may have reflection probability $r^2$ which may be much higher than the transmission probability $t^2$, such that $r^2 + t^2 = 1$. BS 220 may split a particle beam into two beams, e.g., reflected beam and transmitted beam, wherein, for example, the reflected beam may have much higher probability than the transmitted beam and, for example, the phase difference between them may be of approximately π/2. The transmission and reflection amplitudes may be controllable by, for example, a magnetic tunneling bather and/or any other suitable means for transmission of particle waves between channels with controllable probability, for example, by using magnetic fields. As the reflection probability $r^2$ is higher than the transmission probability $t^2$, a particle may propagate in loop 210 for a large number of times, thus, for example, enlarging the effective area A and/or the rotational sensitivity of SI 100.

Loop 210 may rotate at a rotation frequency Ω relative to inertial frame 240. As described above with reference to FIG. 1, if loop 210 rotates, for example, clockwise, particles propagating clockwise in the loop may reach the splitter 220 with an additional negative phase shift, while particles propagating anti clockwise through trajectory b may reach splitter 220 with a positive phase shift. The phase difference between the two trajectories may determine the output amplitude $a_{out}$. Thus, for example, the phase shift between the matter-waves in trajectories a and b may change with the rotation frequency Ω. The rotation frequency Ω may be deduced, therefore, from the output amplitude $a_{out}$.

According to some embodiments of the present invention, a particle, for example, an atom, incident from port i may exit at port o through one of four kinds of trajectories: (a) transmission through BS 230, reflection at BS 220 and then transmission through BS 230 again. The total excess phase which may be gained by this path is approximately π; (b) reflection at BS 230, reflection at BS 220 and then reflection at BS 230 again, with substantially no excess phase; (c) transmission at BS 230, transmission at BS 220, propagation in the counter-clockwise direction through loop 210 for a certain number of times and then transmission again through BS 220 and then through BS 230, with a total excess phase of approximately 2π and a phase due to Sagnac effect because of the propagation through loop 210; and (d) reflection at BS 230, transmission at BS 220, propagation in clockwise direction in loop 210 for a certain number of times and then transmission again through BS 220 and then through BS 230, with total phase of approximately π and a phase due to Sagnac effect because of the propagation through loop 210. Trajectories (a) and (b) and trajectories (c) and (d) may have substantially the same length.

When loop 210 is not rotating relative to inertial frame 240 the phase in trajectories (a) and (b) may be substantially opposite and the phase of trajectories (c) and (d) may be substantially opposite, thus, for example, the probability to exit at port o may be substantially zero, due to, for example, full destructive interference. However, when loop 210 is rotating relative to inertial frame 240 the particle beams propagating clockwise and counterclockwise through loop 210 may add opposite phase shifts proportional to the rotation frequency Ω and to the number of passes through loop 210. These phase shifts may increase the probability for a positive output of particles at port o, wherein the probability may depend on the rotation frequency Ω. Therefore, for example, the rotation frequency Ω and/or changes in the rotation frequency Ω may be deduced by measurement of output transmission at port o.

In the embodiment of the present invention shown in FIG. 2, a large majority of the particles may follow trajectories with substantially the same length, for example, trajectories (c) and (d) described in detail above. Therefore, it may be possible to use SI 200 with high flux of particles with wide momentum bandwidth, substantially without decreasing the rotational sensitivity of SI 200.

In this embodiments of the present invention, for example, the output transmission probability at port o as a function of the rotational phase $\Phi(\Omega)$, which may be notated $\overline{P}(\Phi)$, may be approximately represented by $$\overline{P}(\phi) = \frac{t^2}{1+r^2}\left[1 - \frac{cos^2\phi}{1 + 4(r/t^2)^2 sin^2\phi}\right].$$

Figure 3:
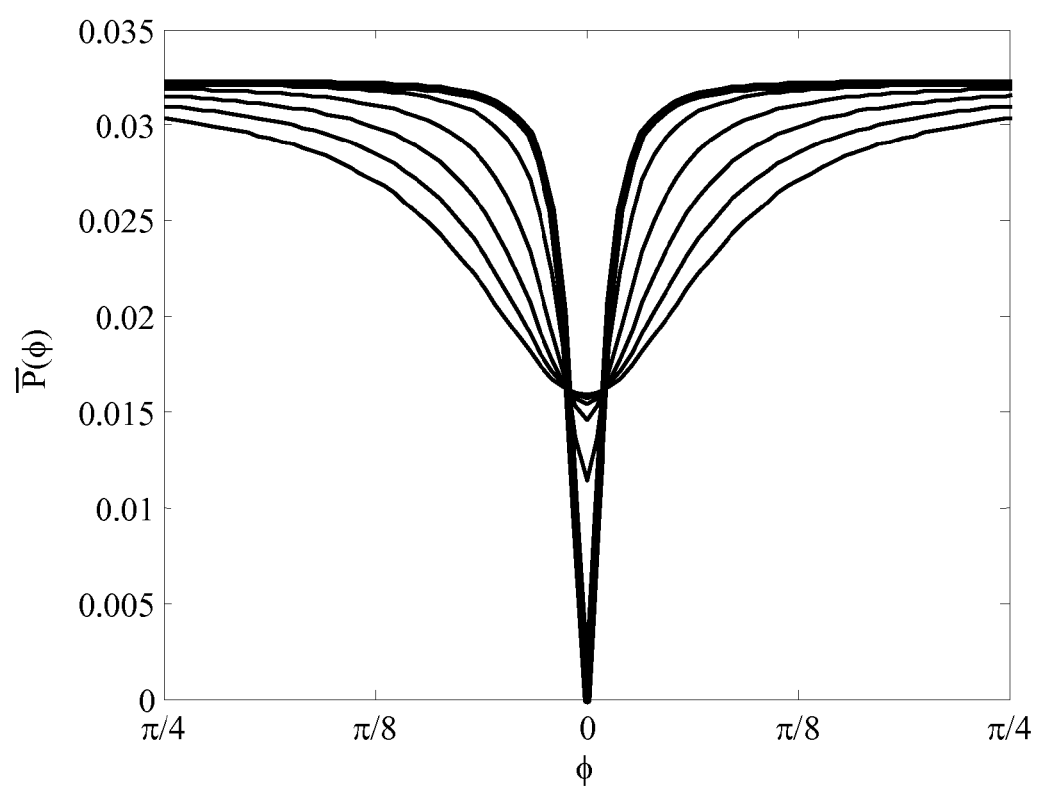
FIG. 3 is a graph illustrating output transmission probability of a SI (Sagnac interferometer) according to some embodiments of the present invention.

Accordingly, for example, the output transmission probability $\overline{P}(\Phi)$ may be substantially zero when the rotational phase (Sagnac phase) Φ is substantially zero, e.g., when the rotation frequency Ω is substantially zero. When ϕ>>t²/r, the output transmission probability P̄(Φ) may asymptotically approach t²/2r. The thick curve in FIG. 3 is a graph illustrating the output transmission probability P̄(Φ). Other curves in FIG. 3 illustrate output transmission probabilities of SIs according to embodiments of the present invention having imperfections in the guiding potential of the loop, for example, with reflection amplitudes up to 0.25. Thus, the dependency of output transmission probability P̄(Φ), in rotation frequency Ω may be stronger as t/r is smaller.

The sensitivity of the output transmission at port o to changes in the rotation frequency Ω in this embodiment of the present invention, may be defined as the minimum change in the rotation frequency Ω which may generate a noticeable (beyond noise level) change in the output transmission at port o. This minimum change may be represented by $$\delta\Omega_{min} = \frac{h}{4\pi m A \overline{P}'(\phi)} \sqrt{\frac{\overline{P}(\phi)}{N}},$$

wherein P̄'(Φ), is the derivative of the output transmission probability with respect to the Sagnac phase Φ and N is the total number of incident particles integrated over the time of measurement. Thus, for example, the rotation sensitivity may be maximal when the Sagnac phase Φ is substantially zero, e.g., when the rotation frequency Ω is substantially zero. Additionally, for example, the rotation sensitivity may be proportional to the square root of the transmission amplitude t through BS 220.

A Sagnac interferometer according to embodiments of the present invention may provide high rotational sensitivity due to, for example, the ability to propagate particles in loop 210 for a large number of times, thus, for example, enlarging the effective area A and/or the rotational sensitivity of the Sagnac interferometer. Therefore, for example, the actual size of a Sagnac interferometer according to embodiments of the present invention may be very small, for example, having a loop radius of 1 cm. This may enable, for example, implementation of such SI on an atom chip.

The maximum velocity of the atoms in this embodiment may be limited by the magnetic force by which the SI may be bounded to an atom chip. For example, the SI may be bounded to the chip by magnetic field gradients of approximate order of Gauss/μm, which may be generated, for example, by wires on the chip, for example, about 10 μm from the surface of the chip. The centrifugal force mv²/r of the circulating atoms should be below the magnetic force bounding the SI to the chip. For example, the maximum velocity of the atoms may be about 10 m/sec.

As described above with reference to FIG. 2, the time for which the atoms may stay in the SI may depend on the transmission probability t² of BS 220. The transmission amplitude of BS 220 may be, for example, about t=0.035. This transmission amplitude may allow an atom to stay in the SI for about, e.g., 10 seconds, which may enable about 1000-2000 rotations in the guiding loop. For an input flux of, for example, 10⁹ atoms per second, a rotation sensitivity of about $5 \times 10^{-12} rad \cdot s^{-1}/\sqrt{Hz}$ may be obtained.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An apparatus for detecting a change in a rotation frequency relative to an inertial frame of reference utilizing matter waves with a wide range of energies without loss of sensitivity, the apparatus comprising:

a guiding loop for guiding the propagation of a first matter wave of particles in a clockwise direction and a second matter wave of particles in a counterclockwise direction, the guiding loop occupying a real area and having an effective area;

an input port through which matter waves of particles enter;

an output port through which matter waves of particles exit;

exactly one beam splitter on the guiding loop, wherein the exactly one beam splitter includes a magnetic tunneling barrier having a controllable transmission probability, and wherein the exactly one beam splitter is operative to probabilistically perform an action from a group consisting of:

reflecting, with a first input reflection probability, a particle of the first matter wave from the input port away from the guiding loop;

transmitting, with a first input-loop transmission probability, a particle of the first matter wave from the input port into the guiding loop;

reflecting, with a first loop-loop reflection probability, a particle of the first matter wave within the guiding loop to remain inside the guiding loop;

transmitting, with a first loop-output transmission probability, a particle of the first matter wave within the guiding loop out of the guiding loop;

reflecting, with a second input reflection probability, a particle of the second matter wave from the input port away from the guiding loop;

transmitting, with a second input-loop transmission probability, a particle of the second matter wave from the input port into the guiding loop;

reflecting, with a second loop-loop reflection probability, a particle of the second matter wave within the guiding loop to remain inside the guiding loop;

transmitting, with a second loop-output transmission probability, a particle of the second matter wave within the guiding loop out of the guiding loop; and a means of measuring a change in an output transmission at the output port, for detecting a change in the rotation frequency.

2. The apparatus of claim 1, wherein the first loop-loop reflection probability and the second loop-loop reflection probability are large enough to permit particles to remain inside the guiding loop for more passes inside the guiding loop, and thereby increase the effective area of the guiding loop.

3. The apparatus of claim 1, wherein the first loop-loop reflection probability and the second loop-loop reflection probability are controlled to be large enough to permit particles to remain inside the guiding loop for more passes inside the guiding loop, and thereby increase the effective area of the guiding loop.

* * * * *